(12) United States Patent
Scheer et al.

(10) Patent No.: US 7,388,471 B2
(45) Date of Patent: Jun. 17, 2008

(54) ANTI-THEFT SYSTEM AND METHOD

(75) Inventors: Glenn O. Scheer, Dubuque, IA (US);
Dennis P. Reiter, Asbury, IA (US);
Kenneth Franck, Dubuque, IA (US)

(73) Assignee: Deere & Company, Moline, IL (US)

( * ) Notice: Subject to any disclaimer, the term of this patent is extended or adjusted under 35 U.S.C. 154(b) by 215 days.

(21) Appl. No.: 11/188,579

(22) Filed: Jul. 25, 2005

(65) Prior Publication Data

US 2007/0018796 A1    Jan. 25, 2007

(51) Int. Cl.
B60R 25/10    (2006.01)

(52) U.S. Cl. .............. 340/426.1; 340/426.11; 340/426.12; 340/426.35; 340/425.5; 307/10.1; 307/10.2; 307/10.4; 180/287; 180/237

(58) Field of Classification Search ............. 340/426.1, 340/426.11, 426.12, 426.35, 425.5; 180/287, 180/271, 237; 307/10.1, 10.2, 10.4, 10.6
See application file for complete search history.

(56) References Cited

U.S. PATENT DOCUMENTS

| | | | |
|---|---|---|---|
| 4,134,301 A * | 1/1979 | Erwin, Jr. .................... 73/453 |
| 5,547,039 A | 8/1996 | Berger et al. | |
| 5,635,916 A * | 6/1997 | Bucholtz et al. .......... 340/5.24 |
| 5,821,631 A | 10/1998 | Loraas et al. | |
| 5,828,297 A | 10/1998 | Banks et al. | |
| 6,060,981 A | 5/2000 | Landes | |
| 6,067,007 A * | 5/2000 | Gioia .................... 340/426.19 |
| 6,236,120 B1 | 5/2001 | Loraas et al. | |
| 6,525,643 B1 * | 2/2003 | Okada et al. .............. 340/5.24 |
| 6,570,267 B1 | 5/2003 | Moriya et al. | |
| 6,611,193 B1 * | 8/2003 | Weigl et al. ................. 340/5.2 |

* cited by examiner

*Primary Examiner*—Hung Nguyen
(74) *Attorney, Agent, or Firm*—Baker & Daniels LLP

(57) ABSTRACT

In accordance with the present invention, an anti-theft system includes an input device and a processor having an associated memory, the memory including instructions executable by the processor to activate the anti-theft system in response to receiving an authorization code from the input device and, when the anti-theft system is activated, to lock the engine in response to receiving one of a user code and a master code from the input device.

14 Claims, 10 Drawing Sheets

ANTI-THEFT SYSTEM AND METHOD

TECHNICAL BACKGROUND

The present invention generally relates to anti-theft systems and methods and more particularly relates to anti-theft systems and methods for preventing the theft of construction equipment.

BACKGROUND OF THE INVENTION

The theft of construction equipment for use and/or vandalism is a concern to construction equipment owners. Due to the nature of the work, the equipment is often left unattended at construction sites, and even more enticing to potential thieves, some construction equipment is often left running at idle. Small pieces of equipment such as skid steer loaders are relatively simple to steal because they are small and can be easily loaded on a trailer and removed from the construction site.

While some machines used at construction sites are purchased with a security system already installed and activated on the machine, other machines are purchased either with no security system installed or with a security system installed but deactivated. Thus, if an owner of a machine without a security system desires to have a security system installed on their machine, then the owner has to obtain software and/or hardware for installation of the security system on the machine in the field. Similarly, if an owner of a machine with an installed and deactivated security system desires to activate the security system, then the owner has to obtain software to activate the system as well. Therefore, the installation and/or activation of a security system on a machine after the machine has been purchased may require significant order, shipment and installation time.

Security systems currently used on machines often require the entry of a security code to allow starting, to enable hydraulics, or to actuate other functionality on the machines. These security systems, however, have multiple shortcomings. First, such security systems often require that the same code be used by both an owner of the machine and a daily operator of the machine. Second, an operator of the machine must enter the security code to unlock the engine every time that the operator enters and starts the machine, as well as every time the operator locks the engine and exits the machine. The use of the term "lock" herein refers to preventing the engine from starting, and the use of the term "unlock" refers to enabling the engine to start. Additionally, because the security code is often common to all machines at a construction site, a thief could potentially steal multiple machines at a construction site upon discovery of the security code.

Other known security systems use multiple security codes, for example an access code and a start code, wherein the access code is either a "user code" or a "master code." In these systems, the user code is known to an operator of the machine and allows the operator to lock and unlock the engine, and the master code is known to the owner of the machine and allows the owner to lock and unlock the engine and perform other machine functions that the user code does not allow. While machines having these types of security systems are less vulnerable to theft than machines having systems requiring the use of a single security code, these machines are still vulnerable if the user and master codes are discovered.

For all of these reasons, a security system is needed that does not require significant resources (e.g., money, expertise, time) to activate on a machine after the machine is purchased and which makes it increasingly difficult for the machine to be stolen while still providing simplicity of use to the machine's operators.

SUMMARY OF THE INVENTION

In one form of the present invention, an anti-theft system is provided, including an input device and a processor having an associated memory, the memory including instructions executable by the processor to activate the anti-theft system in response to receiving an authorization code from the input device and, when the anti-theft system is activated, to lock an engine in response to receiving one of a user code and a master code from the input device.

In another form of the present invention, a method of locking an engine is provided, the method including the steps of activating an anti-theft system in response to receiving an authorization code, and when the anti-theft system is activated, locking the engine in response to receiving one of a user code and a master code.

In still another form, the present invention provides a computer readable medium that stores instructions which cause a processor to perform a method of locking an engine, the method including the steps of activating an anti-theft system in response to receipt of an authorization code, and when the anti-theft system is activated, locking the engine in response to receipt of one of a user code and a master code.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Figure 1:
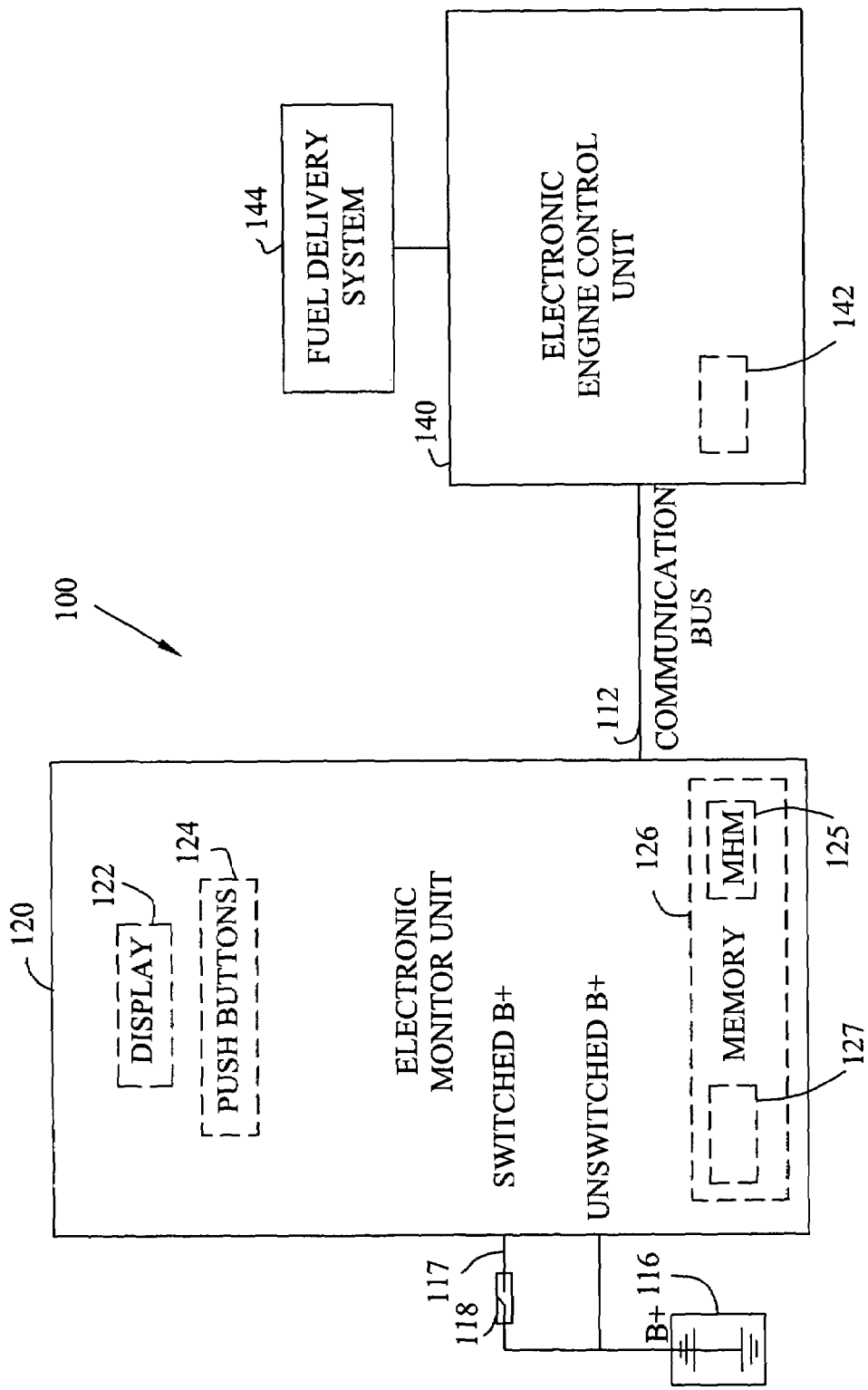
FIG. 1 is a block diagram of one embodiment of applicant's anti-theft system.

Corresponding reference characters indicate corresponding parts throughout the several views. Although the drawings represent embodiments of the present invention, the drawings are not necessarily to scale and certain features may be exaggerated in order to better illustrate and explain the present invention.

DESCRIPTION OF THE INVENTION

The embodiments disclosed below are not intended to be exhaustive or limit the invention to the precise forms disclosed in the following detailed description. Rather, the embodiments are chosen and described so that others skilled in the art may utilize their teachings.

As has been described, the use of the term "lock" refers to preventing the engine from starting, and the use of the term "unlock" refers to enabling the engine to start. Any of a plurality of different techniques may be employed to lock and unlock the engine in a machine, including interrupting the machine's ignition circuit or the utilizing electrical and/or mechanical systems to inhibit the operation of the engine. The term "user code" herein refers to a code used by the operator of a machine to routinely lock and unlock the engine. A machine operator may also use the user code to change the then-current user code. User code level authorization is typically given to a machine operator who frequently uses a construction machine, e.g., on a daily basis. The use of the term "master code" herein refers to a code used by a machine operator who does not use a machine as frequently as the operator having user code level authorization. Master code level authorization is typically given to a person having authority over the operator having user code level authorization, e.g., an owner of the machine or a supervisor at the construction work site where the machine is used. The master code has priority over the user code, may be used to lock and unlock the engine, and may also be used both to reset any user code and to change the then-current master code.

The use of the term "authorization code" herein refers to a code used to activate the anti-theft system on the machine so that the machine's engine can be locked and unlocked. The authorization code may be used to activate the anti-theft system on a machine at the factory location before being purchased by a dealer, to activate the anti-theft system on a machine at the dealer location before being purchased by a customer, or to activate the anti-theft system on a machine in the "field," i.e., at a location separate from the factory and dealer locations. In most instances, the field is where the construction machine is being used. The authorization code may also be used to deactivate the anti-theft system, which effectively resets the user and master codes. The use of the term "valid code" may refer to any of an authorization code, a user code and a master code. A code entered into the anti-theft system of the present invention is valid if the entered code is either equal to a corresponding code stored by the system at the time the code is entered or equal to a permanent code stored by the system.

The anti-theft system shown in FIG. 1 may be implemented in older model construction machines having a separate input device and electronic controller. Anti-theft system 100 includes input device 120 and electronic controller 140, with which input device 120 communicates via communication bus 112. Input device 120 includes a display 122, push buttons 124 and memory 126. In an exemplary embodiment of the present invention, input device 120 is an electronic monitor unit or an electronic display monitor. Input device 120 enables the operator of the machine to communicate with the machine and to manipulate the operating characteristics of the machine to their preference. Display 122 may be a liquid-crystal display or the like, and push buttons 124 may constitute a keypad having any number of buttons (e.g., two or four), a keyboard, a touch-sensitive screen, or any other suitable input mechanism which is actuable by an operator of the machine such that each of push buttons 124 are responsive to operator actuation to produce a signal. Accordingly, a machine operator may use push buttons 124 to input an authorization, a user and/or a master code into input device 120. In other embodiments, other operator actuable means for inputting these codes may be used, for example, any of a variety of known security code interface modules having different types of internal hardware.

Input device 120 is powered by battery 116 and is coupled to ignition key switch 118 via conductive path 117. Ignition key switch 118 is actuable with a key and has an "on" position and an "off" position. Ignition key switch 118 closes when the machine operator uses the key to move ignition key switch 118 to the "on" position, thereby applying battery 116 voltage to input device 120 and powering device 120. Memory 126 stores a machine hour meter 125, which runs during the lifetime of the machine and tracks each hour accordingly. Also stored in memory 126 is a computer program 127 having instructions executed by processor 142 to control anti-theft system 100 and to enable a machine operator to interact with the system by selecting from a series of menu options.

Electronic controller 140 may be an engine control unit, an engine control module, a machine controller or other known engine control computer. Electronic controllers such as electronic controller 140 are commonly used in association with construction machines for controlling and accomplishing various functions and tasks including controlling engine operation associated with a particular machine, e.g., controlling a fuel delivery system 144. For this reason, electronic controller 140 typically includes processing means such as a processor 142, associated electronic circuitry such as input/output circuitry, analog circuits and software instructions (none shown), as well as associated memory, e.g., memory 126. Electronic controller 140 is configured to receive signals from fuel delivery system 114, ignition key switch 118 via input device 120, and input device 120, among others, that are indicative of certain conditions so that controller 140 may provide appropriate output signals to accomplish certain tasks, such as controlling fuel delivery system 144.

Figure 2:
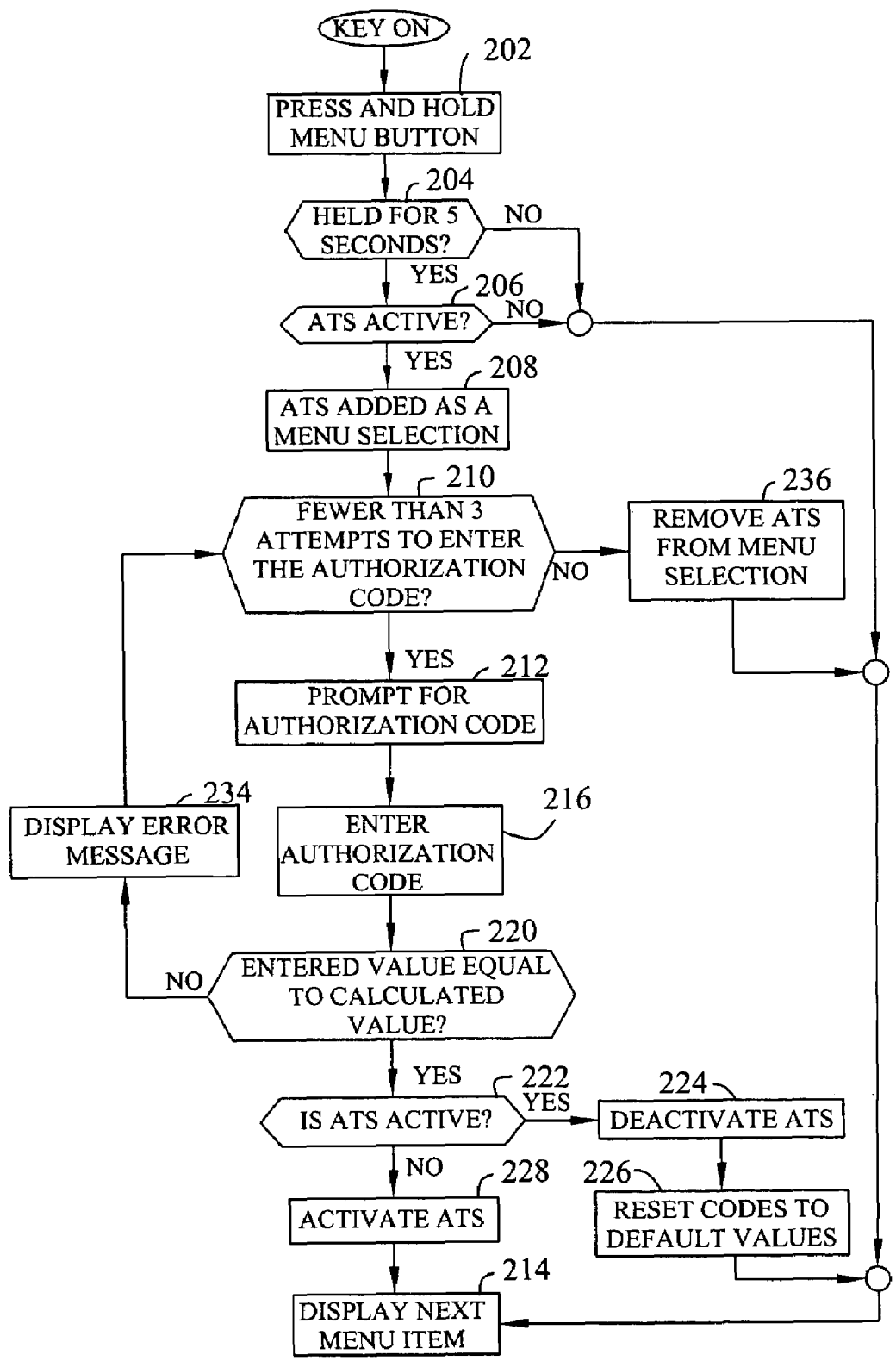
FIG. 2 is a flow diagram illustrating the activation of the anti-theft system of FIG. 1.

During the field activation of anti-theft system 100 or anti-theft system 700 depicted in FIG. 7 and described below, execution of computer program 127, 727 results in the logic flow illustrated in FIG. 2. When a machine operator moves key switch 118 to the "on" position, at step 202 the machine operator presses and holds one of push buttons 124 (i.e., a menu button) on input device 120, 720, and processor 142 causes display 122 to produce a menu on display 122. If processor 142 determines at step 204 that the menu button is held for five seconds, then processor 142 determines at step 206 whether anti-theft system 100, 700 is activated.

If processor 142 determines at step 206 that anti-theft system 100, 700 is activated, then at step 214 processor 142 causes display 122 to display the next menu item. Otherwise, if anti-theft system 100, 700 is not activated, processor 142 causes display 122 to provide anti-theft system 100, 700 as a menu option at step 208. Processor 142 next determines at step 210 whether the machine operator has made fewer than three attempts to enter a first, or an authorization, code. If processor 142 determines that the machine operator has made fewer than three attempts, then display 122 prompts the operator of the machine for an authorization code at step 212. If processor 142 determines at step 210 that the machine operator has made three unsuccessful attempts to enter the authorization code, then processor 142 removes anti-theft system 100, 700 from the menu at step 236 and causes display 122 to display the next menu item at step 214.

In an exemplary embodiment of the present invention, the authorization code changes as machine hour meter 125 changes. Machine hour meter 125 contains an integer value, and this value may be employed in various algorithms stored in memory 126 to calculate the authorization code. For example, the algorithm may be the following: (integer value+1000)/5=authorization code. If the integer value is 125 at a first point in time, then the authorization code would be 225 when using this algorithm. However, if the integer value increments by two every hour, then three hours later the integer value would be 131 and the authorization code would be approximately 226 when using this algorithm. In other embodiments of the present invention, the algorithm and the authorization code may change as machine hour meter 125 changes.

After display 122 prompts the machine operator for an authorization code at step 212, the machine operator enters an authorization code at step 216. In an exemplary embodiment of the present invention, the machine operator obtains the authorization code by contacting a machine dealer. The machine dealer has a computer system which stores and uses the same algorithm in a computer application (e.g., a web browser used to access a website on the Internet). After the machine operator provides the machine dealer with machine-identifying information (e.g., a serial number or machine identification number) and the integer value of machine hour meter 125, the machine dealer's computer application uses the algorithm to calculate an authorization code, which the machine dealer then provides to the machine operator. In other embodiments of the invention, the machine operator may also provide personal identification information to the machine dealer, e.g., the operator's drivers license or social security number.

At step 220 processor 142 determines whether the code entered by the machine operator is equal to the code calculated by the algorithm. If processor 142 determines that the code is equal, then at step 222 processor 142 determines whether anti-theft system 100, 700 is activated. If processor 142 determines that anti-theft system 100, 700 is deactivated, then at step 228 processor 142 activates system 100, 700 and program flow returns to step 214. Otherwise, processor 142 deactivates anti-theft system 100, 700 at step 224 and resets the user code(s) and the master code to their default values at step 226 before program flow returns to step 214 and display 122 displays a menu that does not include anti-theft system 100, 700 as a menu selection. If processor 142 determines at step 220 that the authorization code entered at step 215 is not equal to the authorization code calculated by processor 142, then display 122 showns an error message at step 234 and program flow returns to step 210.

Figure 3:
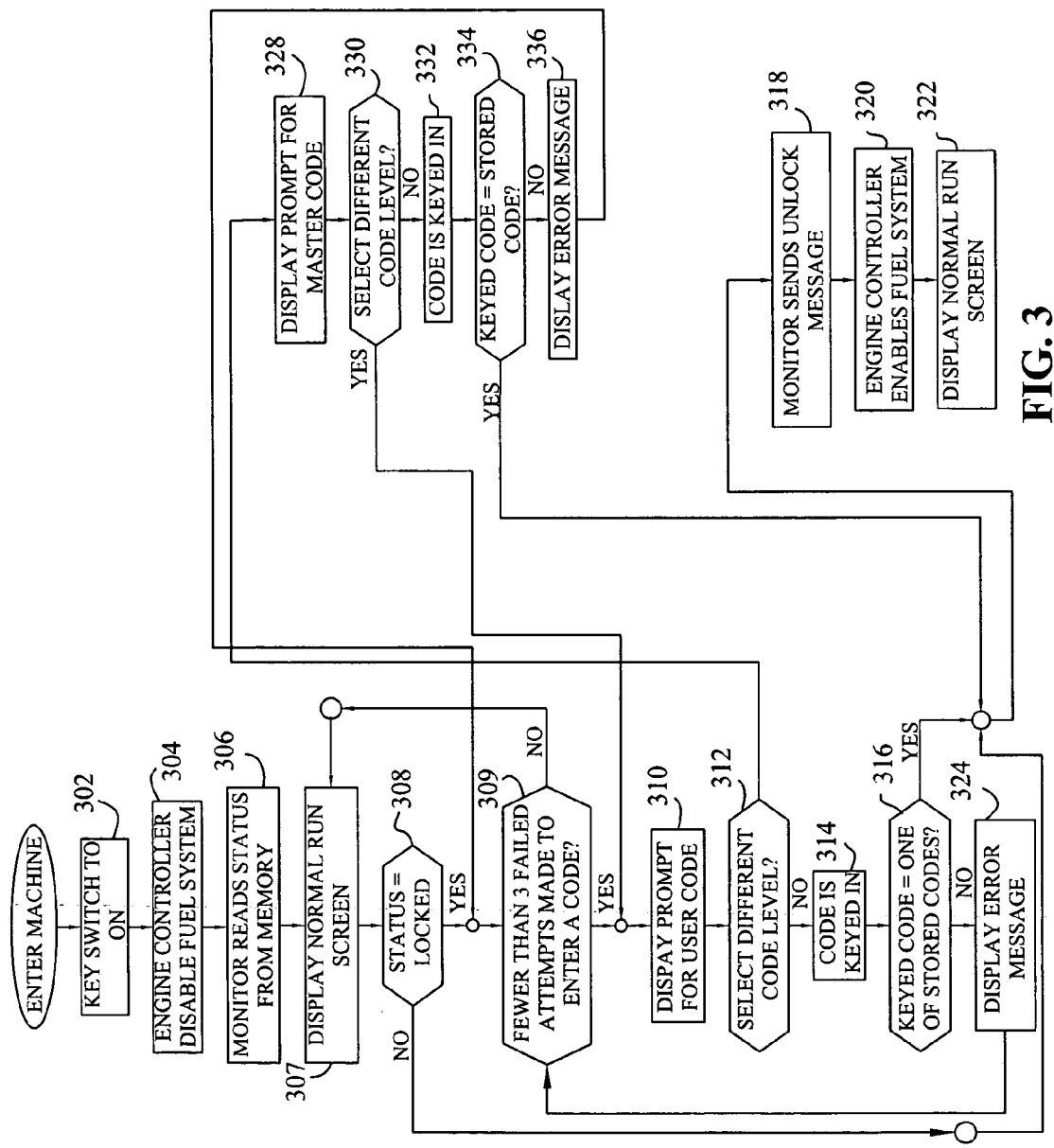
FIG. 3 is a flow diagram illustrating the start up of a machine implementing the anti-theft system of in FIG. 1.

FIG. 3 illustrates the program logic flow during the start up of a machine implementing anti-theft system 100 of FIG. 1. The program flow begins at step 302 when the machine operator moves ignition key switch 118 to the "on" position. Engine controller 140 disables fuel delivery system 114 at step 304, and at step 306 input device 120 reads the current locked/unlocked state of the machine from memory 126. Display 122 next displays a "Normal Run" screen at step 307 to deter random code entry as a means to defeat anti-theft system 100. The Normal Run screen typically includes information pertaining to the machine's engine RPM, hour meter 125, system voltage, engine temperature, hydraulic temperature and gear. If processor 142 determines at step 308 that the engine is unlocked, then at step 318 input device 120 sends an "unlock" message to engine controller 140, and engine controller 140 enables fuel delivery system 114 at step 320. Input device 120 then displays the Normal Run screen at step 322, which is displayed under normal operation of the machine.

If processor 142 determines at step 308 that the engine is locked, then at step 309 processor 142 determines whether the machine operator has made fewer than three unsuccessful attempts to enter a second, or a user, code. If the machine operator has made three unsuccessful attempts, then at step 307 processor 142 causes display 122 to display the Normal Run screen. If processor 142 determines that the machine operator has made fewer than three unsuccessful attempts, then at step 310 processor 142 causes display 122 to prompt the machine operator for the user code. If the machine operator does not opt to select a different code level at step 312, (i.e., a master code), then the machine operator uses push buttons 124 to enter his/her user code at step 314. Processor 142 may recognize multiple user codes. If processor 142 determines at step 316 that the code entered at step 314 is equal to one of the multiple user codes stored in memory 126, then at step 318 input device 120 sends an "unlock" message to engine controller 140, which enables fuel delivery system 114 at step 320. Display 122 then displays the Normal Run screen at step 322. If processor 142 determines at step 316 that the user code entered at step 314 is not equal to one of the multiple stored codes, then at step 324 processor 142 causes display 122 to display an error message to the machine operator and process flow returns to step 309.

If at step 312 the machine operator selects at step 312 to enter a different code level, then at step 328 processor 142 causes display 122 to prompt the machine operator for a master code. If the machine operator opts at step 330 to again select a different code level, then program flow returns to step 310. Otherwise, the machine operator enters a master code into input device 120 at step 332. Processor 142 determines at step 334 whether the master code entered at step 332 is equal to the master code stored in memory 126. If processor 142 determines that the codes are equal, then at step 318 input device 120 sends an "unlock" message to electronic controller 140, and electronic controller 140 enables fuel delivery system 114 at step 320. A Normal Run screen is also displayed on display 122 at step 322. If processor 142 determines at step 334 that the entered master code is not equal to the stored master code, then at step 336 processor 142 causes input device 120 to display an error message on display 122 and process flow returns to step 309.

Figure 4:
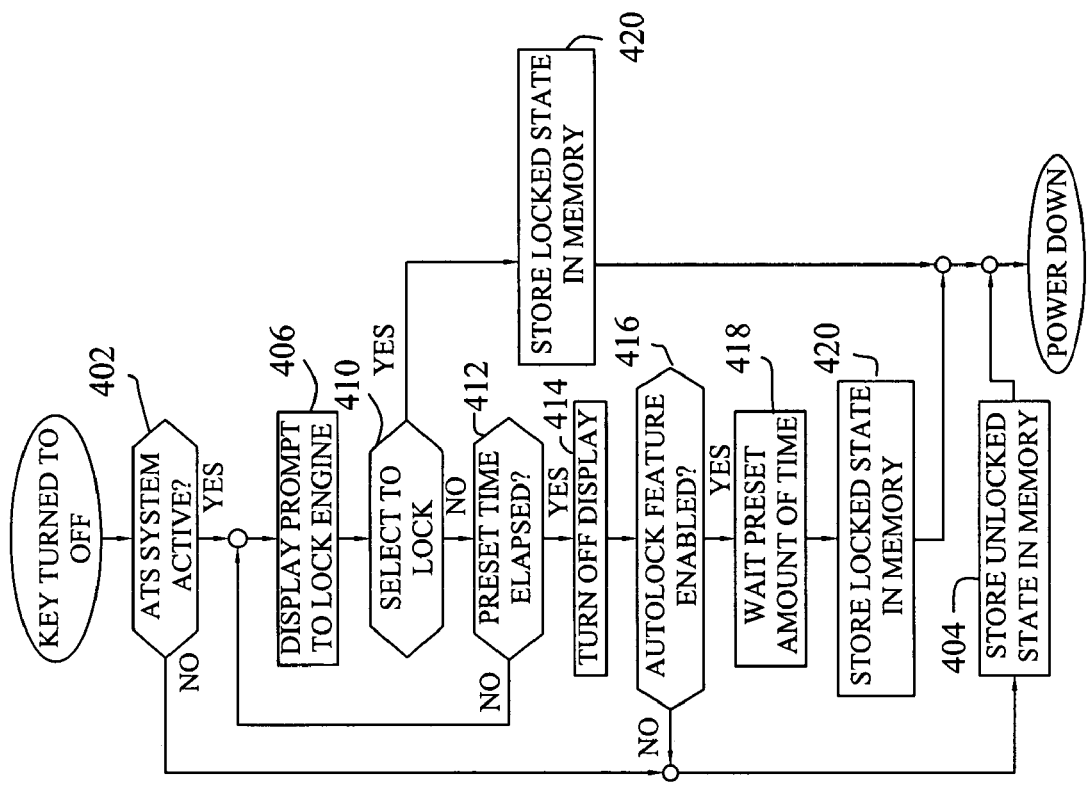
FIG. 4 is a flow diagram illustrating the shut down of a machine implementing the anti-theft system of FIG. 1.

FIG. 4 illustrates the program logic flow during the shut down of a machine implementing anti-theft system 100 of FIG. 1. When the machine operator moves ignition key switch 118 to the "off" position, processor 142 determines at step 402 whether anti-theft system 100 is activated on the machine. If system 100 is not activated, then the engine can not be locked and processor 142 stores an unlocked state in memory 126 at step 404. Monitor 120 then powers down. If processor 142 determines at step 402 that anti-theft system 100 is activated, then at step 406 display 122 prompts the machine operator to lock the engine. At step 410 processor 142 determines whether the machine operator has selected to lock the engine at step 406. If processor 142 determines at step 410 that the machine operator has selected to lock the engine, then at step 420 processor 142 stores a locked state in memory 126 and input device 120 powers down. However, if processor 142 determines at step 410 that the machine operator has not selected to lock the engine at step 406, then processor 142 determines at step 412 whether a preset amount of time has elapsed (e.g., 20 seconds). Processor 142 enables a preset amount of time to elapse so that input device 120 stays powered up long enough to give the machine operator time to lock the engine if he or she chooses to do so. If the preset amount of time has not elapsed, then program flow returns to step 406. If the preset amount of time has elapsed, however, then at step 414 processor 142 turns off display 122 and determines at step 416 whether the auto-lock feature of anti-theft system 100 is enabled. The auto-lock feature enables processor 142 to lock the engine after a preset amount of time has expired without requiring action by the machine operator. If processor 142 determines at step 416 that the auto-lock feature is disabled, then at step 404 processor 142 stores an unlocked state in memory 126 and input device 120 powers down. Otherwise, if processor 142 determines at step 416 that the auto-lock feature is enabled, then processor 142 waits the preset amount of time at step 418 before storing a locked state in memory 126 at step 420. Input device 120 then powers down.

Figure 5:
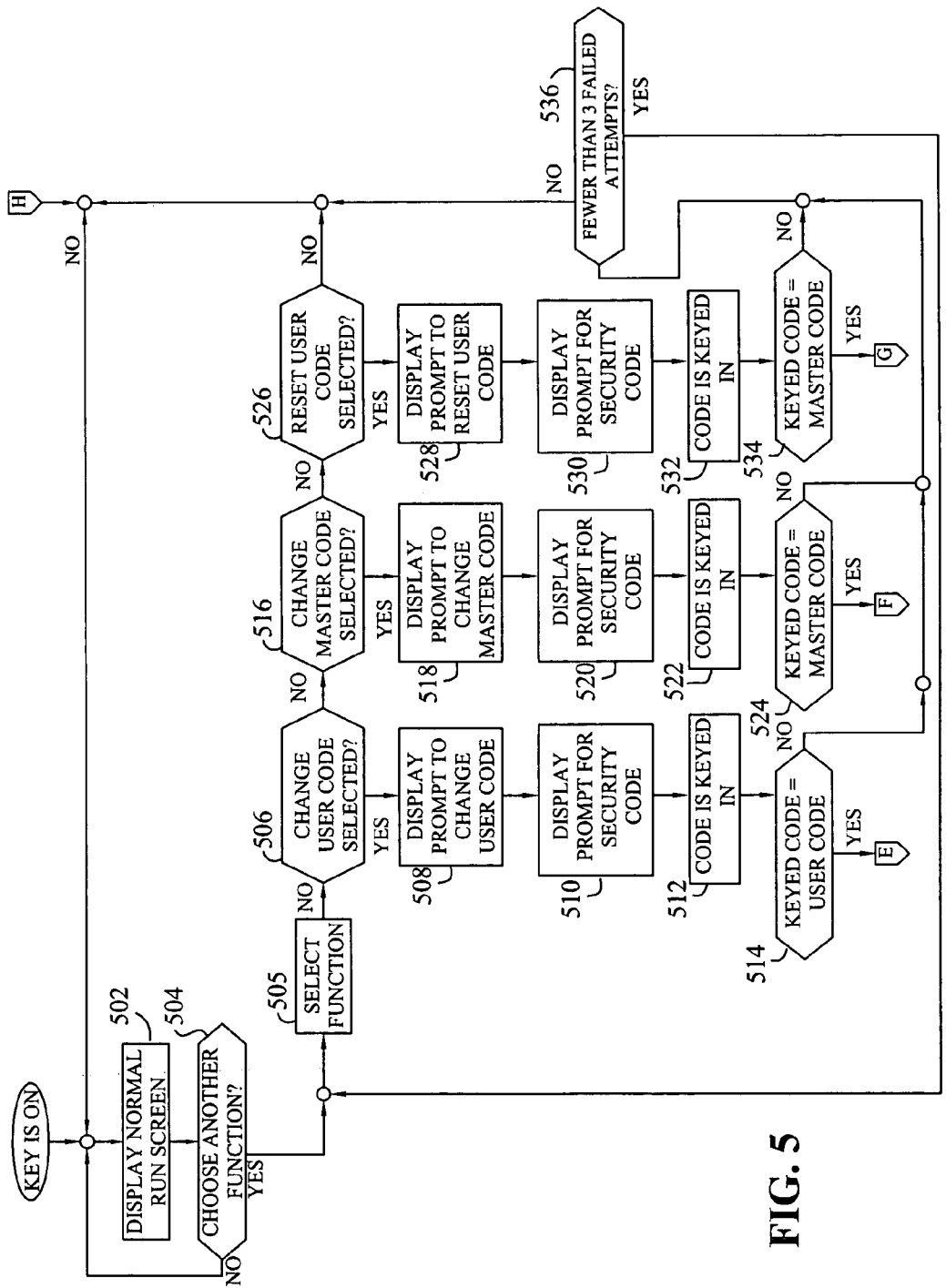
FIG. 5 is a flow diagram illustrating the changing of stored operator codes on a machine implementing anti-theft system of FIG. 1.
Figure 6:
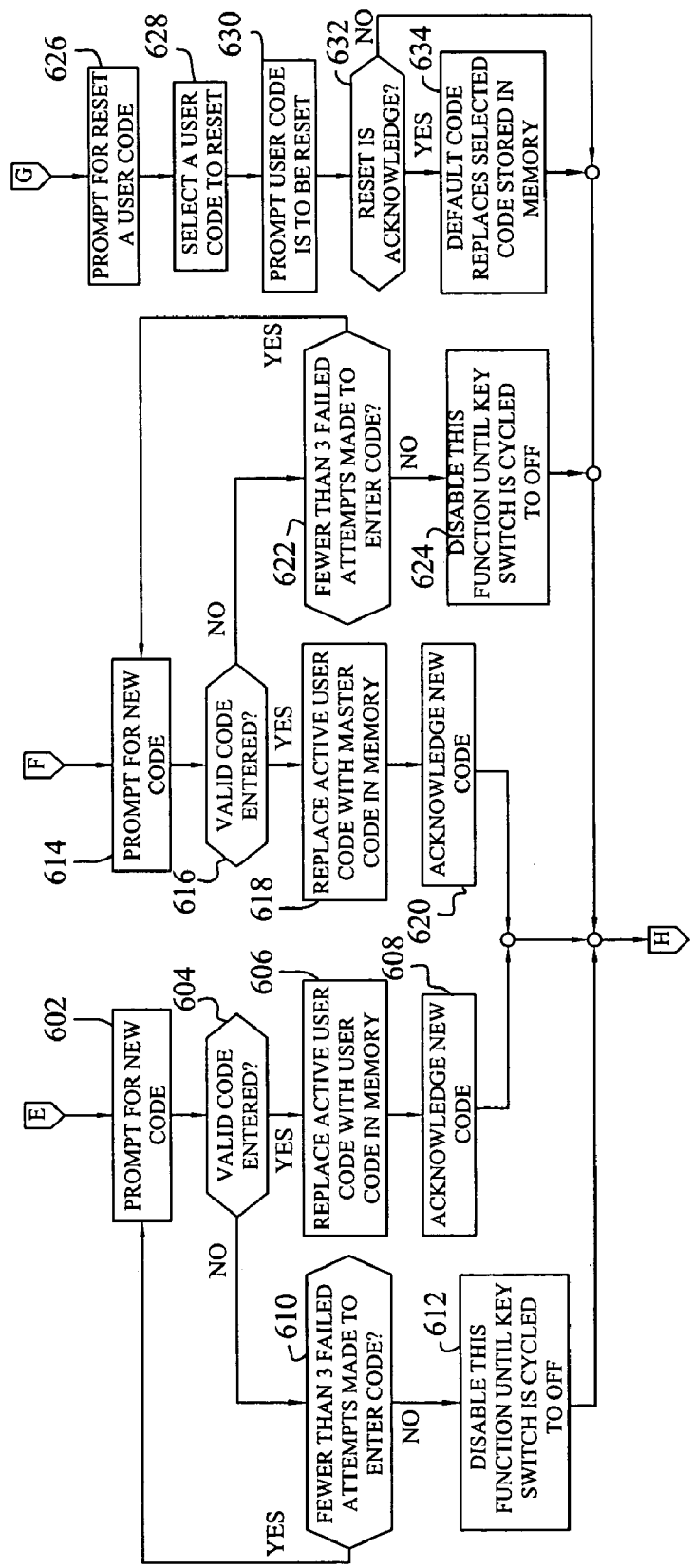
FIG. 6 is a continuation of the flow diagram of FIG. 5.

FIG. 5 illustrates the program logic flow when the machine operator changes a stored code. When a machine operator moves key switch 118 to the "on" position, processor 142 causes display 122 to show the Normal Run screen at step 502. The machine operator may elect at step 504 to choose another function. If the machine operator does not choose another function, then process flow returns to step 502 and display 122 again shows the Normal Run screen 502. If the machine operator elects to choose another function, however, then at step 505 the machine operator may select to change a user code, to change the master code or to reset the user code. At step 506 processor 142 determines whether the machine operator has selected to change the user code. If processor 142 determines that the machine operator has selected to change the user code, then at step 508 processor 142 causes display 122 to prompt the machine operator to change the user code. Processor 142 then causes display 122 to prompt the machine operator for a code at step 510. The machine operator enters the code at step 512, and at step 514 processor 142 determines whether the entered code is equal to a user code stored in memory 126. If the entered code is equal to a user code stored in memory 126, then program flow continues at step 602 (FIG. 6). If the entered code is not equal to a stored user code, then processor 142 determines at step 536 whether the machine operator has made fewer than three unsuccessful attempts to enter a user code. If processor 142 determines that fewer than three attempts have been made, then program flow returns to step 505 and the machine operator may again select to change a user code. However, if processor 142 determines at step 536 that the machine operator has made three unsuccessful attempts, then display 122 shows the Normal Run screen at step 502.

If processor 142 determines at step 516 that the machine operator has selected to change the master code, then at step 518 processor 142 causes display 122 to prompt the machine operator to change the master code. Display 122 then prompts the machine operator for a code at step 520, and the machine operator enters the code at step 522. At step 524 processor 142 determines whether the entered code is equal to the master code stored in memory 126. If the entered code is equal to the master code, then program flow continues at step 614 (FIG. 6); otherwise, at step 536 processor 142 determines whether the machine operator has made fewer than three unsuccessful attempts to enter a master code. If processor 142 determines that fewer than three attempts have been made, then program flow returns to step 505 and the machine operator may again select to change a master code. If processor 142 determines at step 536 that the machine operator has made three unsuccessful attempts to enter a master code, then processor 142 causes display 122 to show the Normal Run screen at step 502.

If processor 142 determines at step 526 that the machine operator has selected to reset a user code, then at step 528 display 122 prompts the machine operator to reset a user code. Processor 142 then causes display 122 to prompt the machine operator for a code at step 530. The machine operator enters a code at step 532, and at step 534, processor 142 determines whether the entered code is equal to the stored master code. If the entered code is equal to the master code, then program flow continues at step 626 (FIG. 6). If the entered code is not equal to the stored master code, then processor 142 determines at step 536 whether the machine operator has made fewer than three unsuccessful attempts to enter a master code. If processor 142 determines that fewer than three attempts have been made, then program flow returns to step 505 and the machine operator may again select to change a master code. However, if processor 142 determines at step 536 that the machine operator has made three unsuccessful attempts to enter a master code, then display 122 displays the Normal Run screen at step 502.

FIG. 6 illustrates the continuation of the program logic flow of FIG. 5 when the machine operator changes a stored code. When processor 142 determines at step 506 (FIG. 5) that the machine operator selected to change a user code, processor 142 causes display 122 to prompt the machine operator at step 602 for a new user code. If processor 142 determines at step 604 that the machine operator has entered a valid user code, then at step 606 processor 142 replaces the active user code in memory 126 with the new user code, and display 122 provides a visual indication to the machine operator at step 608 that processor 142 acknowledges the new code before program flow returns to step 502. If processor 142 determines at step 604 that the machine operator did not enter a valid code at step 602, then at step 610 processor 142 determines whether the machine operator has made fewer than three unsuccessful attempts to enter a user code. If processor 142 determines that fewer than three unsuccessful attempts have been made, then at step 602 processor 142 causes display 122 to prompt the machine operator for the new user code. However, if the machine operator makes three unsuccessful attempts, then at step 612 processor 142 disables the change user code function until the machine operator moves ignition key switch 118 to the "off" position, thereby deterring random code entry as a means to defeat anti-theft system 100 before the machine is shut down. Program flow then returns to step 502 (FIG. 5) and display 122 shows the Normal Run screen.

When processor 142 determines at step 516 (FIG. 5) that the machine operator selected to change the master code, at step 614 processor 142 causes display 122 to prompt the machine operator for a new code. At step 616 processor 142 determines whether the code entered by the machine operator is a valid code. If the machine operator has entered a valid master code, then at step 618 processor 142 replaces the active master code in memory 126 with the new master code. At step 620 display 122 indicates to the machine operator that processor 142 acknowledges the new code and program flow returns to step 502. If processor 142 determines at step 616 that a valid master code has not been entered, then at step 622 processor 142 determines whether the machine operator has made fewer than three unsuccessful attempts to enter a valid code. If processor 142 determines at step 622 that the machine operator has made fewer than three attempts to enter a master code, then at step 614 processor 142 causes display 122 of input device 120 to prompt the machine operator for the new master code. Otherwise, processor 142 disables the change master code function at step 624 until ignition key switch 118 is cycled to the "off" position to deter random code entry as a means to defeat anti-theft system 100 before the machine is shut down. Program flow then returns to step 502.

When processor 142 determines at step 526 (FIG. 5) that the machine operator selected to reset a user code, at step 626 processor 142 causes display 122 to prompt the machine user for a user code. At step 628 the machine operator selects a user code to reset, and at step 630 processor 142 resets the selected code and causes display 122 to notify the machine operator that the selected user code is reset. The machine operator may acknowledge the reset by pressing the appropriate push button 124 on input device 120. Processor 142 determines at step 632 whether the machine operator acknowledged the reset, and if the reset was acknowledged, then at step 634 processor 142 replaces the selected user code stored in memory 126 with a default user code. Program flow then returns to step 502. If processor 142 determines that the machine operator did not acknowledge the reset, then display 122 displays the Normal Run screen at step 502.

Figure 7:
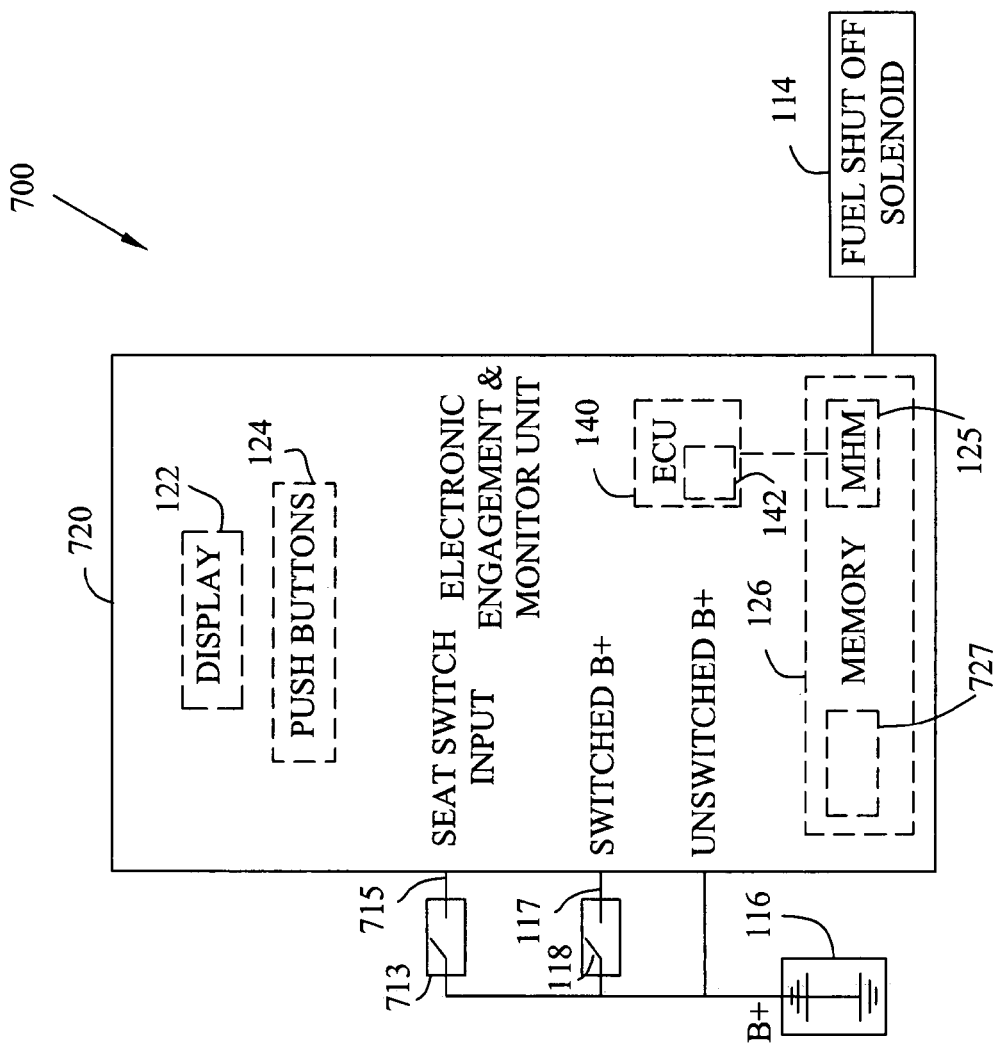
FIG. 7 is a block diagram of another embodiment of applicant's anti-theft system.

Another embodiment of the anti-theft system is shown in FIG. 7 and may be implemented in late model construction machines. In this embodiment, input device 720 is integral with electronic controller 140, and electronic controller 140 includes microprocessor 142. At least one seat switch 713 is coupled to input device 720 by way of conductive path 715. Seat switch 713 is located within the seat of the construction machine and is activated (i.e., opens or closes) when an operator sits in the seat. Input device 720 powers up when seat switch 713 is activated but provides limited functionality to the machine operator until ignition key switch 118 is closed (i.e., the machine operator may monitor the Normal Run screen but may not administer any setting changes). Computer program 727 is stored in memory 126 and contains instructions which control anti-theft system 700 when program 727 is executed by processor 142.

Figure 8:
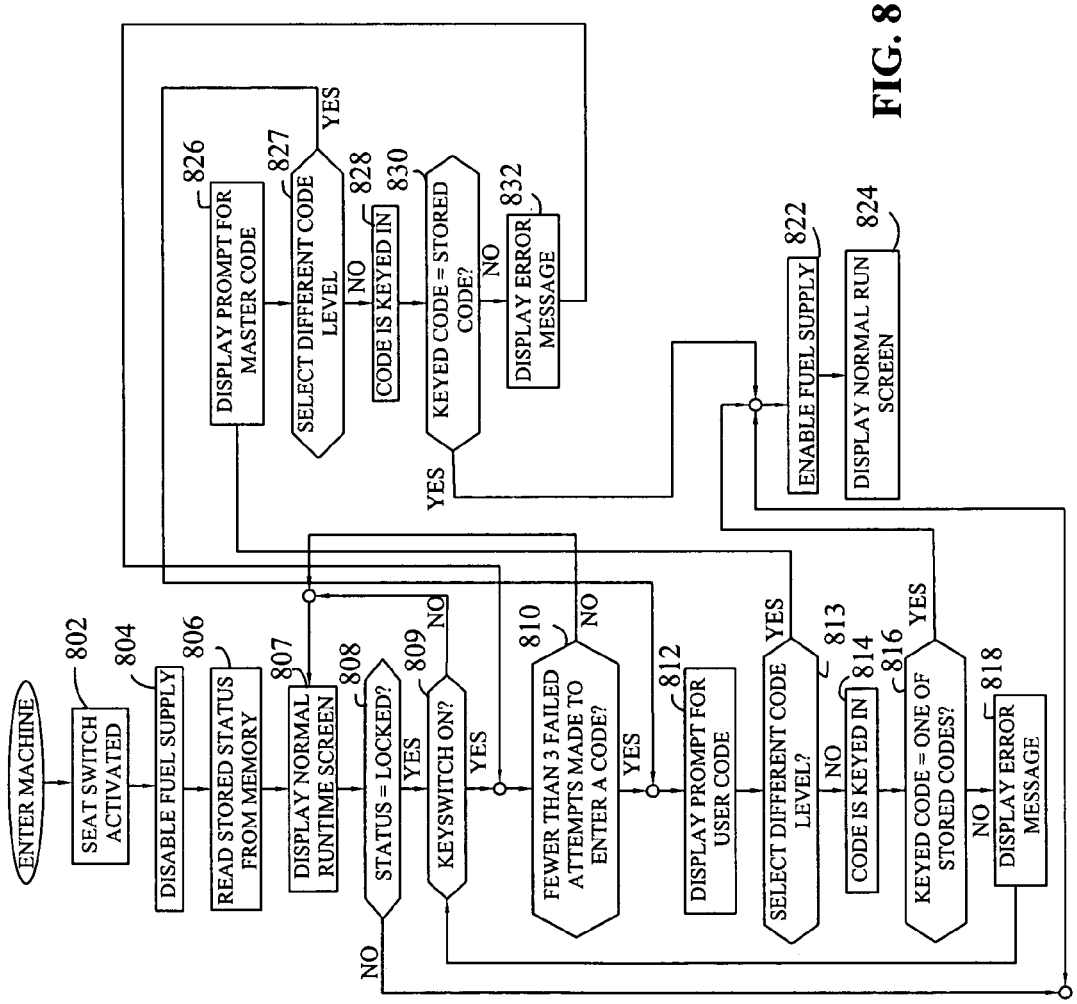
FIG. 8 is a flow diagram illustrating the start up of a machine implementing the anti-theft system of FIG. 7.

FIG. 8 illustrates the program logic flow during the start up of a machine implementing anti-theft system 700 of FIG. 7. When a machine operator enters the machine, thereby activating seat switch 713 at step 802, processor 142 disables the machine's fuel supply at step 804. Processor 142 then reads at step 806 the locked/unlocked state of the engine from memory 126 and causes display 122 to display the Normal Run screen at step 807. Processor 142 then determines at step 808 whether the engine is locked. If processor 142 determines at step 808 that the engine is unlocked, then at step 822 processor 142 enables the machine's fuel supply and causes display 122 of input device 720 to display a Normal Run screen to the machine operator at step 824.

If processor 142 determines at step 808 that the engine is locked, then at step 809 processor 142 determines whether ignition key switch 118 is in the "on" position. If processor 142 determines that ignition key switch 118 is not in the "on" position, then processor 142 causes display 122 to display the Normal Run screen when program flow continues at step 807. If processor 142 determines that ignition key switch 118 is in the "on" position, then processor 142 ascertains at step 810 whether the machine operator has made fewer than three unsuccessful attempts to enter a user code. Display 122 displays the Normal Run screen at step 807 if processor 142 determines that the machine operator has made three unsuccessful attempts; otherwise, processor 142 causes display 122 to prompt the machine operator for a user code at step 812. If the machine operator does not select to enter a different code level at step 813, then at step 814 the machine operator enters a user code into input device 720. Processor 142 then determines at step 816 whether the user code entered at step 814 is equal to one of the multiple user codes stored in memory 126. If processor 142 determines at step 816 that the user code is equal to one of multiple stored user codes, then at step 822 processor 142 enables the fuel supply and causes display 122 to display a Normal Run screen to the machine operator at step 824. If processor 142 determines that the entered user code does not match any of the stored user codes, then at step 818 display 122 displays an error message to the machine operator. Program flow then returns to step 810.

As described above, the machine operator may select a different code level at step 813. If the machine operator makes this selection, then program flow continues at step 826 and processor 142 causes display 122 to prompt the machine operator for a master code at step 826. The machine operator may again decide at step 827 to select a different code level. If the machine operator decides to select a different code level, then program flow returns to step 812, as described above, and display 122 again prompts the machine operator for a user code. Otherwise, the machine operator enters a master code at step 828. Processor 142 ascertains at step 830 whether the master code entered at step 828 is equal to the master code stored in memory 126. If the entered master code equals the stored code, then at step 822 processor 142 enables the fuel supply and causes display 122 to display a Normal Run screen at step 824. If processor 142 determines at step 830 that the master code entered at step 828 is not equal to the stored master code, then at step 832 processor 142 causes display 122 to present an error message to the machine operator. Program flow then returns to step 810.

Figure 9:
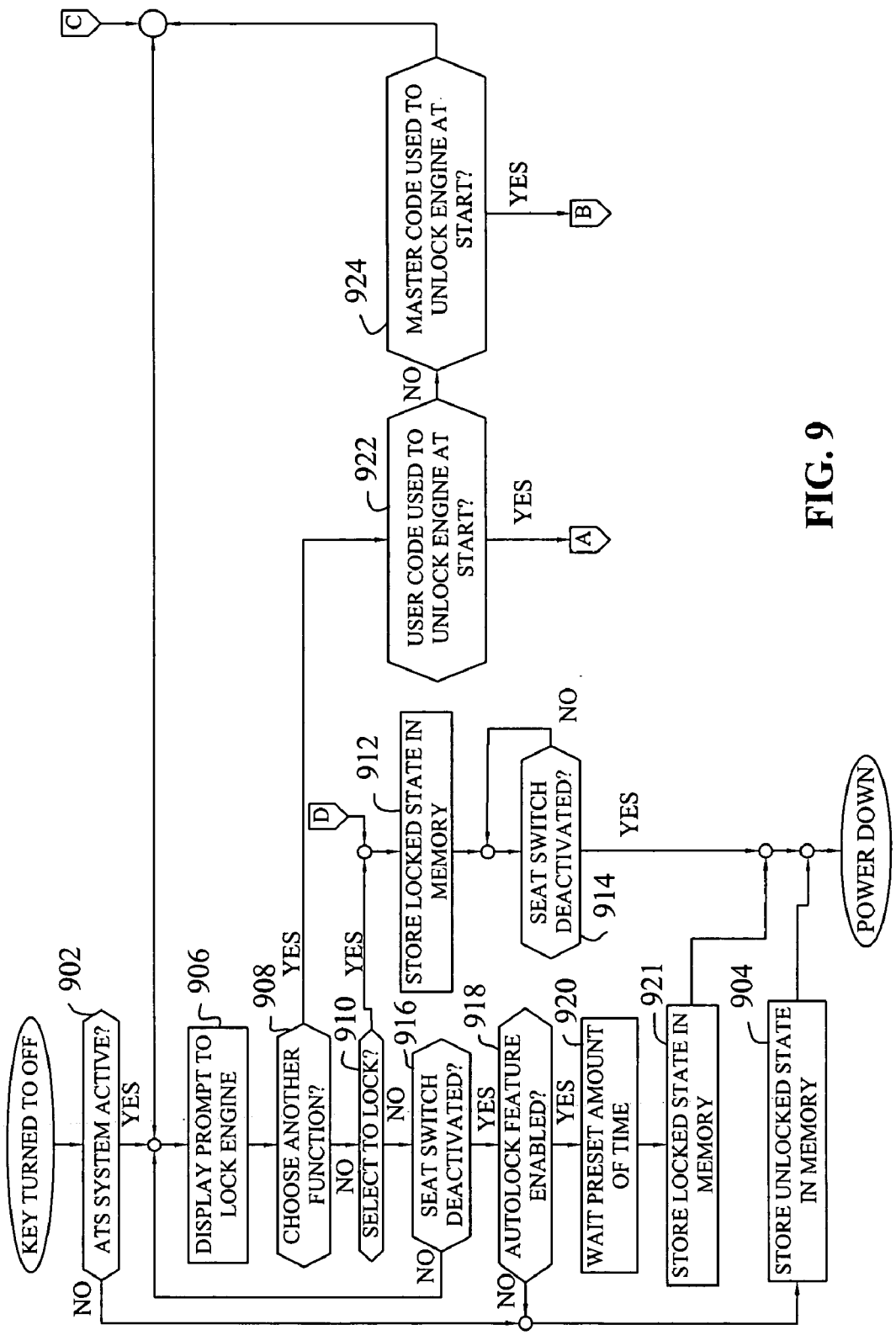
FIG. 9 is a flow diagram illustrating the shut down up of a machine implementing the anti-theft system of FIG. 7.

FIG. 9 illustrates the program logic flow during the shut down of a machine implementing anti-theft system 700 of FIG. 7. When the machine operator moves ignition key switch 118 from the "on" position to the "off" position, processor 142 determines at step 902 whether anti-theft system 700 is activated. If processor 142 determines that system 700 is not activated, then at step 904 processor 142 stores an unlocked state in memory 126 and input device 120 powers down. If processor 142 determines at step 902 that anti-theft system 700 is activated, then at step 906 processor 142 causes display 122 of input device 120 to prompt the machine operator to lock the engine. The machine operator may choose a function at step 908 other than locking the machine, such as changing the current user or master code. If the machine operator does not choose another function at step 908, then processor 142 ascertains at step 910 whether the machine operator has selected to lock the engine. If the machine operator has selected to lock the engine at step 906, then at step 912 processor 142 stores the locked state in memory 126. Processor 142 then determines at step 914 whether seat switch 713 is deactivated (i.e., the machine operator is no longer sitting in the machine's seat). If processor 142 determines that seat switch 713 is deactivated, then input device 120 powers down. Otherwise, program flow returns to step 914 until processor 142 determines that seat switch 713 is deactivated.

The machine operator may not select to lock the engine at step 910. If the machine operator does not select to lock the engine, then at step 916 processor 142 determines whether seat switch 713 is deactivated. If processor 142 determines that seat switch 713 is activated, then program flow returns to step 906 and processor 142 causes display 122 to prompt the machine operator to lock the engine. If processor 142 determines at step 916 that seat switch 713 is deactivated, then at step 918 processor 142 determines whether the auto-lock feature of anti-theft system 700 is enabled. The auto-lock feature enables processor 142 to lock the engine after a preset amount of time has expired without requiring action by the machine operator. If processor 142 determines that the feature is enabled, then at step 920 processor 142 waits a preset amount of time before storing the locked state in memory 126 at step 921. Input device 120 then powers down. If processor 142 determines at step 918 that the auto-lock feature is not enabled, then at step 904 processor 142 stores the unlocked state in memory 126 and input device 120 powers down.

Figure 10:
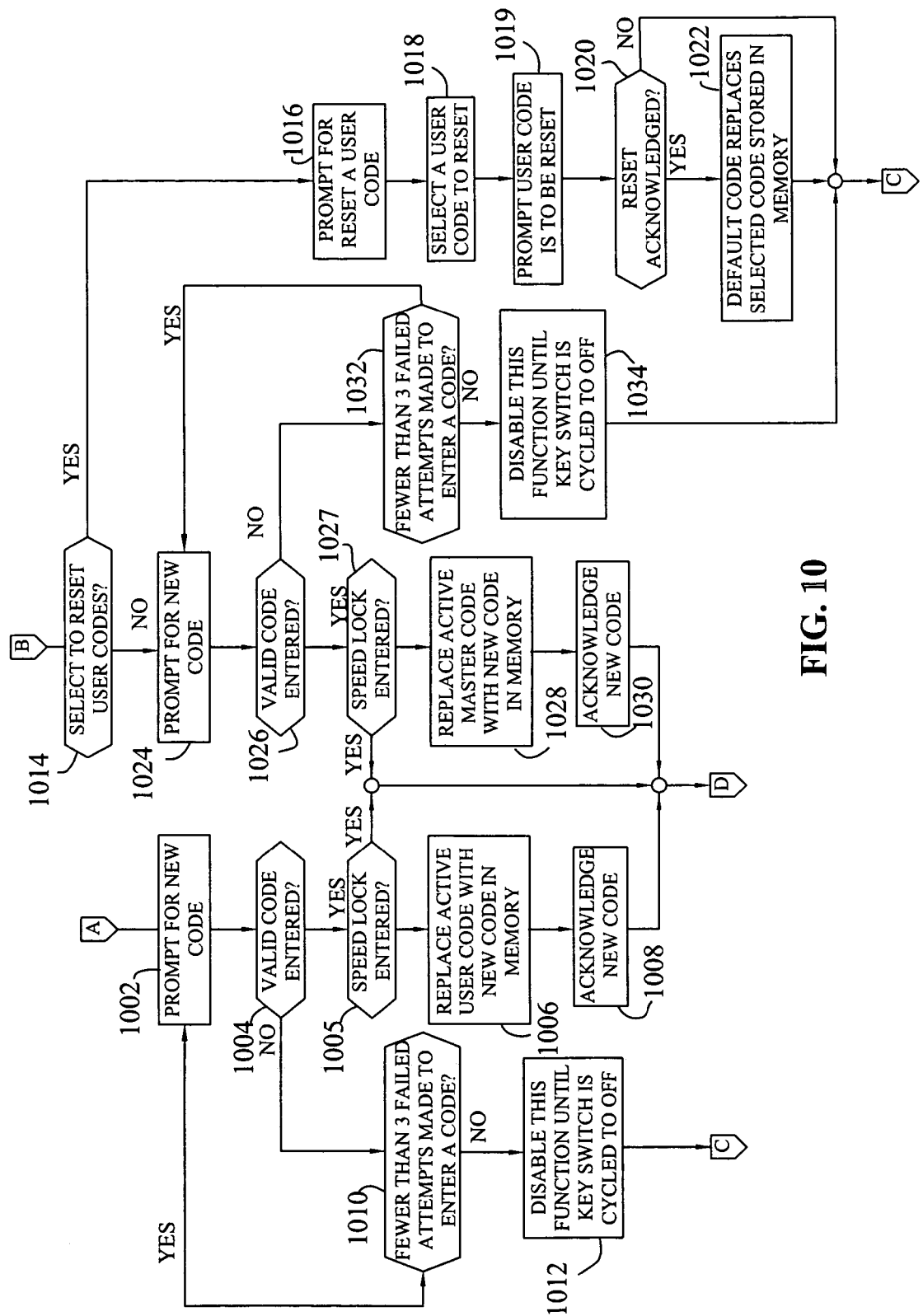
FIG. 10 is a flow diagram illustrating the changing of stored codes on a machine implementing the anti-theft system of FIG. 7.

As described above, the machine operator may choose a function at step 908 other than locking the machine. In this case, program flow continues at step 922 and processor 142 determines whether the machine operator used a user code to unlock the engine at step 814. If processor 142 determines that the machine operator used a user code to unlock the engine, then the machine operator has user level access to the machine and is able to change the stored user code when program flow continues at step 1002 (FIG. 10). If processor 142 determines at step 922 that the machine operator did not use a user code to unlock the engine, then at step 924 processor 142 determines whether the machine operator used a master code to unlock the engine at step 828. If processor 142 determines that the machine operator used a master code to unlock the engine, then the machine operator has master level access to the machine and is able to reset the stored user codes and change the master code when program flow continues at step 1014 (FIG. 10). If processor 142 determines at step 924 that the machine operator did not use a master code to unlock the engine, then program flow returns to step 906 and display 122 again prompts the machine operator to lock the engine.

FIG. 10 shows the program logic flow when the machine operator changes and/or resets codes stored in memory 126. As described above, when processor 142 determines at step 922 that the machine operator has used a user code to unlock the engine, then at step 1002 processor 142 causes display 122 to prompt the machine operator for a new user code. Processor 142 then determines at step 1004 whether the machine operator entered a valid user code at step 1002. If processor 142 determines at step 1004 that the machine operator entered a valid user code, then processor 142 causes display 122 to present the machine operator with an option to speed lock the engine at step 1005. The speed lock feature enables the machine operator to power down the machine without continuing to change the user code. If processor 142 determines at step 1005 that the machine operator selected to speed lock the engine, then program flow returns to step 912 (FIG. 9). Otherwise, at step 1006 processor 142 replaces the current active user code stored in memory 126 with the new user code entered at step 1002. The machine operator then acknowledges the new code at step 1008 and program flow returns to step 912 (FIG. 9).

If processor 142 determines at step 1004 that the machine operator entered an invalid user code at step 1002, then at step 1010 processor 142 ascertains whether the machine operator has made fewer than three unsuccessful attempts to enter a valid user code. If the machine operator has made fewer than three unsuccessful attempts, then at step 1002 processor 142 causes display 122 to prompt the machine operator for a new user code. If processor 142 determines at step 1010 that the machine operator has made three unsuccessful attempts to enter a valid user code, then at step 1012 processor 142 disables the function enabling the machine operator to change the user code until ignition key switch 118 is cycled to the "off" position. Display 122 then prompts the machine operator to lock the engine at step 906. (FIG. 9)

When processor 142 determines at step 924 that the machine operator used a master code to unlock the engine, the machine operator may select to reset user codes at step 1014. If the machine operator selects to reset users code at step 1014, then at step 1016 processor 142 causes display 122 to prompt the machine operator to reset a user code. The machine operator then selects a user code to reset at step 1018. At step 1019 display 122 notifies the machine operator that the selected user code is to be reset, and processor 142 determines at step 1020 whether the machine operator has acknowledged the reset. If processor 142 determines that the machine operator has acknowledged the reset, then at step 1022 processor 142 replaces the selected user code stored in memory 126 with a default user code. If the machine operator has not acknowledged the reset, then program flow returns to step 906 (FIG. 9) and the user code stored in memory 126 remains unchanged.

The machine operator may select not to reset user codes at step 1014. In this case, processor 142 causes display 122 at step 1024 to prompt the machine operator for a new master code. Processor 142 determines at step 1026 whether the machine operator has entered a valid master code at step 1024. If the machine operator has entered a valid code, then at step 1027 processor 142 causes display 122 to present the machine operator with an option to speed lock the engine. If processor 142 determines that the machine operator has selected the speed lock option, then program flow returns to step 912 (FIG. 9). Otherwise, processor 142 replaces the active master code stored in memory 126 with the new code at step 1028. The machine operator then acknowledges the new code at step 1030 and program flow returns to step 912 (FIG. 9).

If processor 142 determines at step 1026 that the machine operator entered an invalid master code at step 1024, then at step 1032 processor 142 determines whether the machine operator has failed to enter a valid master code in fewer than three attempts. If the machine operator has made fewer than three unsuccessful attempts, then at step 1024 processor 142 causes display 122 to again prompt the machine operator for a new code. However, if processor 142 determines that the machine operator has made three unsuccessful attempts to enter a master code, then at step 1034 processor 142 disables the function enabling the machine operator to change the master code until ignition key switch 118 is cycled to the "off" position. Processor 142 then causes display 122 to prompt the machine operator to lock the engine when program flow returns to step 906 (FIG. 9).

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:
1. An anti-theft system, including:
   an input device; and
   a processor having an associated memory, the memory including instructions executable by said processor to activate the anti-theft system in response to receipt of a first code from the input device and, when the anti-theft system is activated, to lock the engine in response to receipt of a second code from the input device.

2. The system of claim 1 further comprising an ignition key switch in communication with said processor and actuable with a key.

3. The system of claim 2 wherein the memory includes instructions executable by said processor to unlock the engine upon receipt of the second code when the system is activated and said ignition key switch is actuated.

4. The system of claim 1 wherein the memory includes instructions executable by said processor to lock the engine without receipt of the second code from said input device.

5. The system of claim 1 wherein said input device has associated memory storing a machine hour meter therein, the machine hour meter incrementing an integer value with the passage of time.

6. The system of claim 5 wherein said processor determines whether the first code is equal to a reference code computed by said processor using an algorithm that incorporates the integer value.

7. The system of claim 1 wherein the second code includes at least one user code.

8. The system of claim 7 wherein the second code includes a master code.

9. A method of locking an engine, the method including the steps of:
   activating an anti-theft system in response to receipt of a first code; and
   when the anti-theft system is activated, locking the engine in response to receipt of a second code.

10. The method of claim 9 further comprising a step of unlocking the engine in response to receipt of the second code when the anti-theft system is activated.

11. The method of claim 10 wherein the step of unlocking includes a step of actuating an ignition key switch.

12. The method of claim 9 further including a step of locking the engine without receipt of the second code.

13. The method of claim 9 wherein the step of activating includes a step of calculating a reference code using an algorithm that incorporates an integer value that increments with the passage of time.

14. The method of claim 13 wherein the step of activating includes a step of determining whether the second code is equal to the reference code.

* * * * *